United States Patent
Riley

[15] 3,699,442
[45] Oct. 17, 1972

[54] BI-DIRECTIONAL SIGNAL DETECTOR WITH INPUT/OUTPUT ISOLATION

[72] Inventor: John A. Riley, Williamsville, N.Y.

[73] Assignee: Westinghouse Electric Corporation, Pittsburgh, Pa.

[22] Filed: May 25, 1971

[21] Appl. No.: 146,749

[52] U.S. Cl. ............... 324/98, 324/99 R, 324/117 R, 332/12
[51] Int. Cl. ...... G01r 17/02, G01r 17/06, G01r 33/00
[58] Field of Search ..... 324/98, 99 R, 117 R; 332/12; 329/122

[56] References Cited

UNITED STATES PATENTS 3,634,875  1/1972  Bixby.........................324/98

Primary Examiner—Rudolph V. Rolinec
Assistant Examiner—Ernest F. Karlsen
Attorney—F. H. Henson, R. G. Brodahl and C. J. Paznokas

[57] ABSTRACT

DC (direct current) signal magnitude and direction detection apparatus wherein separate signals derived from the respective primary energizing paths for alternate opposite magnetic saturation of a magnetic flux coupled oscillator, are compared to provide an indication of the magnitude and direction of net DC signal input applied to an input winding or windings of the oscillator.

11 Claims, 3 Drawing Figures

3,699,442

BI-DIRECTIONAL SIGNAL DETECTOR WITH INPUT/OUTPUT ISOLATION

RELATED CASES

The present application relates to improvements over the subjects matter of the following U.S. patent applications assigned to the same assignee as the present application: Ser. No. 49,310, now U.S. Pat. No. 3,634,875, filed June 24, 1970 by Brian J. Bixby; and Ser. No. 55,316, filed July 16, 1970 by the applicant herein, John A. Riley.

BACKGROUND OF THE INVENTION

The above referenced U.S. Patent applications, directed to DC signal detection systems employing flux coupled self-excited oscillators, performed adequately and successfully for many applications. It was found that in such systems when employed to detect extremely low level signals from a current shunt through a long set of leads, the low level signal for example 50 MV could not produce sufficient driving power when a resistance was added to the input lead so as to minimize the input resistance change of a possible 250 foot cable connection to the signal source (shunt). The resulting driving signal necessitated an increase in gain in the DC detector which in turn made it more sensitive to variations caused by temperature effects upon the diodes and transistors in the detector system.

The example disclosed in the aforesaid Ser. No. 55,316, has ten diodes and transistors in the oscillator and five diodes in the symmetrical limiter. When the oscillator modulation is only a small percentage for example, 1 percent, the effects of temperature in the diodes, transistors and Zener produce an increasing amount of error in the output.

SUMMARY OF THE INVENTION

The invention is directed to a unique DC input signal modulated magnetic flux coupled oscillator type of DC signal detector having improved sensitivity to low level signals and minimal error due to temperature effects on the components.

In accordance with one embodiment of the invention a low level DC signal detection system includes a saturable core magnetic flux coupled self-excited oscillator having a pair of parallel power input paths connected across a DC source for alternately saturating the core in opposite directions, each power input path including a winding on the core and a controllable electric valve, such as a transistor. Individual electric signals derived from and representing the respective currents in the two paths are compared to provide an indication of the amplitude and direction of net DC signal input applied to a signal input winding or windings on the core.

DRAWINGS

Figure 1:
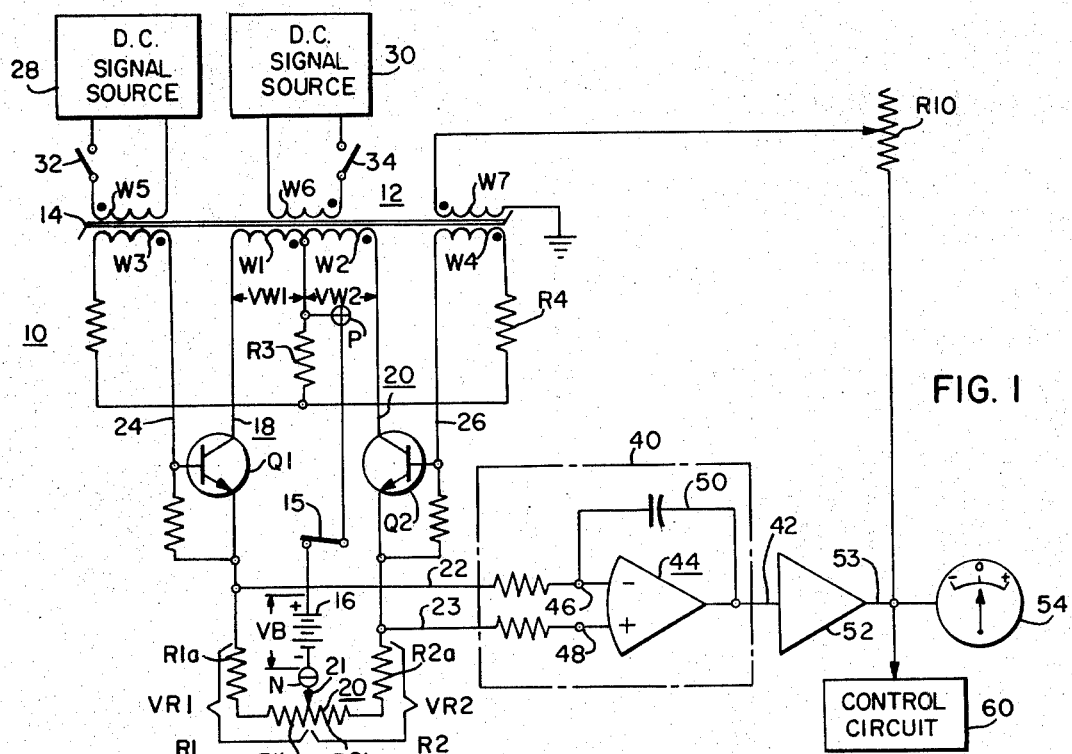
FIG. 1 is a circuit diagram of a preferred embodiment of the invention.
Figure 2:
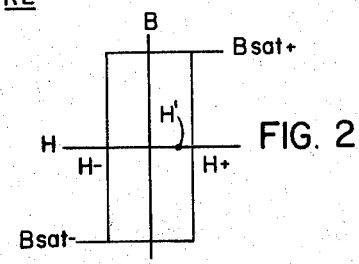
FIGS. 2 and 3 are charts useful in explaining the operation of the circuit of FIG. 1.

Referring now to FIG. 1, there is shown a detection system which has a magnetically coupled self-excited oscillator 10 that includes a transformer system, shown for example as a transformer 12 with a plurality of inductively related windings W1, W2, W3, W4, W5, W6 and W7 carried by a saturable magnetic core 14 having a rectangular hysteresis loop, for example the square loop B-H characteristics as shown in FIG. 2. The oscillator further includes a pair of electric valves Q1 and Q2 for passing DC from a suitable DC power source 16 alternately through the power input windings W1 and W2 in opposite directions. By way of example the DC power source is shown as a battery connected to the power input terminals P and N of the oscillator. The connection to terminal P is through a switch 15. Core 14 is proportioned to saturate within a predetermined time interval determined by the input windings W1 and W2 and the DC input voltage supplied to the oscillator by the DC source 16.

Although not restricted thereto, valves Q1 and Q2 may be semiconductor valves, for example, transistors as shown. Each of the valves Q1 and Q2 is provided with main electrodes and an internal main current path therebetween. Each valve is also provided with a control electrode for controlling the flow of power between the main electrodes. In the transistor examples the main electrodes of each transistor are the emitter and collector, while the control electrode is the base.

Connected across the power input terminals P-N are a pair of power input paths 18 and 20. Path 18 includes in series, winding W1, the main current path of transistor Q1, and a resistance R1, the latter being constituted by a resistor R1a and a portion R1b of a potentiometer 20. In like manner path 20 includes winding W2, transistor Q2, and a resistance R2 constituted by resistors R2a and R2b. Potentiometer portions R1b and R2b are the resistance portions on opposite sides of the adjustable wiper 21.

Feedback responsive to induced voltages in feedback windings W3 and W4 of transformer 12 is supplied to the bases of transistors Q1 and Q2 through feedback paths 24 and 26 respectively.

The standard dot connection with respect to the polarities of the transformer windings is observed herein. Thus at any given instant all the dotted ends will have the same polarity.

The operation of the circuit thus far described may be briefly summarized as follows.

In operation, the transformer flux is driven in alternating half cycles from saturation of one polarity to the other as indicated at Bsat+ and Bsat−, respectively, in FIG. 2. The flux alternations in the transformer induce potentials of opposite polarity in the feedback windings W3 and W4 of the the transformer. With respect to their effects on the transistors, the feedback circuits reciprocally alternate in relative polarity, that is, at a given time one feedback circuit applies a forward bias to its associated transistor while the other feedback circuit applies a reverse bias to its associated transistor, and each feedback circuit alternately applies forward and reverse bias to its associated transistor. The feedback voltages applied to the bases of transistors Q1 and Q2 alternately render the respective transistors conductive and non-conductive. When one transistor is conducting the other is biased to non-conduction.

When switch 15 is closed, and assuming that current conduction first starts in transistor Q1, this supplies current through the power input path 18 to input winding W1 thereby causing voltages to be induced in all the windings of the transformer. The potentials appearing across the feedback windings W4 and W3 concurrently drive transistor Q2 OFF and transistor Q1 into higher conduction. This action while cumulative is extremely rapid in driving transistor Q1 fully ON.

Current continues to flow through transistor Q1, and the flux increases in the core 14 until the core abruptly saturates in a direction which may be arbitrarily termed the "positive direction" as at Bsat+ (FIG. 2). At core saturation, the induced voltages in windings W3 and W4 go to zero, thus removing base drive from transistor Q1 to turn it OFF. This causes the core flux to collapse to remanence, causing the voltages appearing across feedback windings W3 and W4 to reverse. This will hold transistor Q1 at cutoff and together with current flowing from terminal P through resistors R3 and R4, and winding W4 to the base of transistor Q2 cause transistor Q2 to begin conducting. Now current flows in the power input path 20 through transistor Q2 and input winding W2 thereby causing voltages to be induced in all windings in such direction that the induced potential appearing across feedback windings W4 and W3 will sustain conduction in transistor Q2 and non-conduction in transistor Q1. The input current flow through transistor Q2 and input winding portion W2 will continue to flow until the core saturates in the reverse or negative direction to Bsat− thereby causing reversal of the states of conduction and non-conduction in transistors Q2 and Q1.

The above process of oscillation will continue so long as the operating conditions of the circuit remain normal. Accordingly, it can be seen that the transistor Q1 conducts while the core flux changes from Bsat− to Bsat+, and the transistor Q2 conducts while the flux changes from Bsat+ to Bsat−. The rate at which the core flux changes is a direct function of the voltages VW1 and VW2 applied to the primary windings W1 and W2 each of which voltages is the battery 16 voltage VB minus the voltage developed across resistor R1 or R2 as the case may be (neglecting transistor drops). The voltages across R1 and R2 are labelled VR1 and VR2, respectively, and provide output signals on lines 22 and 23, that are proportional to the currents in the power input paths 18 and 20, respectively.

DC signal input of either polarity is applied to the detector through either one or both of signal input windings W5 and W6 on the core 14. Individual signals from either or a "resultant signal" from both of DC signal sources 28 and 30 may be applied as inputs to the transformer 12 by closing one or both of switches 32 and 34 in circuit between the respective signal source and signal input windings W5 and W6. When both sources 28 and 30 are supplying a signal at the same time to their respective associated input windings, the total signal input is considered a resulting or net DC input, even though the actual signal currents are isolated in the separate windings. The result is the same as if the two signals were mixed (aiding or opposing) in a single winding. The separate windings provide signal source isolation.

Assume that switches 32 and 34 are open so that no DC input signals are applied to windings W5 and W6. Under these conditions, the oscillator 10 will be operating symmetrically. That is, the time required for the magnetic core 14 to go from a Bsat+ to a Bsat− condition will be equal to the time required to go from the Bsat− condition to the Bsat+ condition. This will result in alternating equal conduction times (durations) for transistors Q1 and Q2 and their associated power paths 18 and 20.

If the conduction times of paths 18 and 20 are referred to as mark and space times, respectively, of the oscillator 10, then for the condition of no net DC input signal, that is, symmetrical operation, the mark and space timing will be equal providing a mark-space ratio of 1:1. Under these conditions, equal currents will flow in paths 18 and 20, and voltages VR1 and VR2 developed across resistors R1 and R2, respectively, will be the same assuming equal resistance values for these resistors and symmetrical circuit parameters for paths 18 and 20. If there is any circuit dissymmetry, potentiometer wiper 21 may be moved to equalize VR1 and VR2 under quiescent or no net DC input signal conditions.

Figure 3:
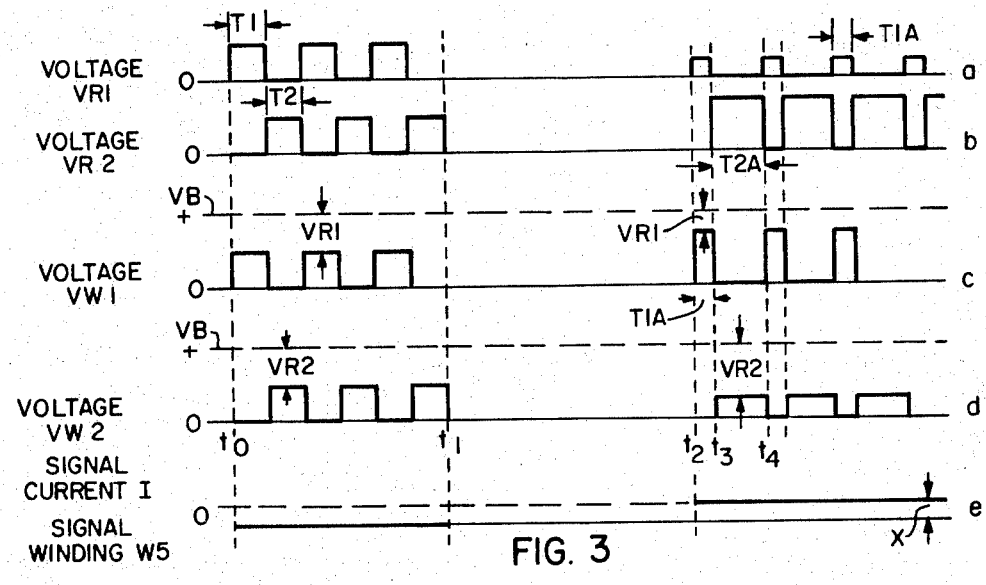

In FIG. 3, the various curves depict conditions during symmetrical and unbalanced operation. Symmetrical operation due to quiescent or zero net DC input signal is represented during the time interval $t0-t1$. Zero net DC input signal may be due to both switches 32 and 34 being open, or to equal and opposite DC input signals applied to windings W5 and W6 (if the windings are symmetrical). For convenience, it is assumed that this condition is brought about by the switches 32 and 34 being open during the time interval $t0-t1$. Curves (a) and (b) show the voltages VR1 and VR2 developed across resistors R1 and R2, while curves (c) and (d) show the voltages VW1 and VW2 applied to the windings W1 and W2. During the time $t0-t1$ (no DC input signal), voltages VR1 and VR2 are equal, and the conduction times T1 and T2 of the respective input power paths 18 and 20 are equal. Curve (c) shows the voltage VW1 across winding W1 with transistor Q1 conducting to be equal to VB−VR1. Similarly, curve (d) shows the relationship between voltages VW2, VB and VR2. During the time $t0-t1$ voltages VW1 and VW2 are equal. Curve (e) shows the signal current I in signal input winding W5. As shown in the curve (e), the input signal current I is zero during time $t0-t1$. Since it was assumed that both input signal switches are open, the input signal current is zero in both signal windings W5 and W6 during time $t0-t1$.

At a later time $t2$, assume that switch 32 is closed to supply a direct current I of magnitude X into the dotted end of winding W5 as shown in curve (e) of FIG. 3. This current will supply some magnetizing force H' to the transformer core 14 (FIG. 2). When transistor Q1 conducts, winding W1 will need to apply to the core 14 a total magnetizing force of H+ minus H', thus reducing the magnetizing current flowing in R1 by a factor proportional to H', thereby reducing the magnitude of voltage VR1 across resistor R1 as seen during the time $t2-t3$ in curve (a) of FIG. 3.

When transistor Q2 conducts starting at time $t3$, the magnetizing force to be applied to the core 14 by winding W2 is H− plus H', thereby increasing the magnetizing current flowing in resistor R2 and therefore the magnitude of the voltage VR2 across that resistor as shown during the time $t3-t4$ in curve (b) of FIG. 3. Under these conditions, when transistor Q1 is conducting, the magnitude of voltage VW1 applied to winding W1, is increased over the no signal current case, and when transistor Q2 at time t2 is conducting, the voltage VW2 applied to winding W2 at time t3 is decreased as compared to the no signal current case.

Since the rate of change of core flux is a direct function of the voltage applied to the respective windings W1 and W2, when transistor Q1 at time t2 conducts, the time period T1A taken for the flux to change from Bsat− to Bsat+ will be less than time period T1 for the no input signal current condition, and when transistor Q2 conducts the time period T2A taken for the flux to change from Bsat+ to Bsat− will be longer than time period T2 for the no signal case. Thus the mark-space ratio of the oscillator (ratio of conduction period of paths 18 and 20) will be something other than 1:1 when there is a net input signal applied to the transformer.

From the foregoing description it is seen that at quiescence, i.e., with no DC input signal, the oscillator oscillates at a frequency determined by circuit parameters, for example, 12 khz. Each transistor conducts for one half cycle creating a pulse across its emitter resistor. With symmetrical operation, the average component of the signals from the emitter resistors R1 and R2 is the same. When a DC input signal unbalances the oscillator, the average signal at one emitter will increase and the other will decrease. Information is thus available at the emitter leads of the oscillator.

In accordance with the invention, differences between the current flowing in the power input paths 18 and 20 are utilized to provide an output signal indicative of direction and amplitude of net DC input signal applied to the transformer signal input windings. Both amplitude and conduction period of the respective currents are taken into consideration in detecting difference between these currents. In contrast, only the durations of mark-time portions of an oscillating cycle are employed in the schemes of the aforementioned Ser. Nos. 49,310 and 55,316.

In the illustrated example, the currents in paths 18 and 20 are compared by detecting the difference between the volt-seconds of the voltages VR1 and VR2. These voltages are functions of and correspond to the currents in paths 18 and 20 respectively. Voltages VR1 and VR2 are applied along signal pick-off lines 22 and 23 to the input of a differential signal average detector 40, that is, apparatus which will provide an output signal that is a function of the difference between the respective averages of the two input signals. In the specific example, the signals supplied to the input lines 22 and 23 of detector 40 are voltages, and the output of detector 40 on line 42 is a function of the difference between the respective volt-seconds of the signals VR1 and VR2 on lines 22 and 23, and thereby proportional to the net D.C. input signal.

By way of example, detector 40 is shown as comprising an operational amplifier 44 having an inverting input terminal 46 symbolized by a minus sign, a non-inverting input terminal 48 symbolized by a plus sign and a feedback circuit 50 providing an integrating characteristic to the amplifier, whereby the amplifier functions as a difference integrator, that is, it will provide an output signal on line 42 that is proportional to the difference between the integrals of the respective input signals supplied to the input terminals 46 and 48. Alternatively, the same function could be performed by first inverting the signal on one of lines 22 and 23, and then applying both the inverted and non-inverted signals to the input terminal 46. In yet another alternative, detector 40 could comprise two separate integrators each fed by one of the lines 22 and 23, and whose outputs are applied to the input circuit of a differential operational amplifier.

Dectector 40 supplies a voltage via line 42 to an inverting amplifier 52, whose output voltage on line 53 is applied through an adjustable resistor R10 to winding W7. These output voltages will be zero when the net DC input signal via windings W5 and W6 is zero. When detector 40 senses an unbalance due to change in DC input signal applied to a signal winding, for example winding W5, the output voltages on lines 42 and 53 change causing current to flow through resistor R10 and winding W7. When this current in winding W7 reaches a magnitude such that the ampere-turns of winding W7 is the same as that of winding W5 but of opposite polarity, oscillator 10 returns to effective quiescent conditions as noted in time interval t0−t1.

The detector output on line 42 and the amplifier output on line 53 will remain constant at a voltage which supplies sufficient current to winding W7 to cancel the effect of current in winding W5. To provide the negative feedback effect of winding W7, DC input signal flowing into the dotted end of winding W5 should result in current flowing into the undotted end of winding W7. Adjustment of resistor R10 establishes a specific output voltage on line 53 for a specific signal input current.

Because of the memory characteristic of an integrator, the detector 40 effectively compares the averages of the voltages VR1 and VR2, although both occur only successively and not concurrently, and provides an output signal that is a function of the difference between the respective volt-seconds of voltages VR1 and VR2. Thus the magnitude and polarity of this output signal is a function of and indicative of the magnitude and polarity of the net DC signal supplied to the input signal windings W5 and W6. The relationship between input and output is linear.

Other well known differential average detectors would not necessarily require the negative feedback from the output of amplifier 52 to winding W7 that is necessary with the integrator examples described. However, in such other types of detectors, the output signal from the detector 40 may be fed back to the oscillator in negative feedback relation through winding W7 to improve device linearity.

It should be understood, that in case there is greater signal attenuation between the signal pick-off of one of R1 and R2 and its associated input of amplifier 44 than between the other of R1 and R2 and its associated input of amplifier 44, such attenuation dissymmetry may be compensated for by arranging the signal pick-off at different taps on R1 and R2. For example, the tap or signal pick-off may be at the upper end of one of R1 and R2 as is shown, while the signal pick-off may be an intermediate tap on the other of R1 and R2. Such attenuation dissymmetry between the two signal lines may for example be due to special networks for protecting the input circuits of the amplifier.

In the operational example where the closing of switch 32 supplies DC signal of magnitude X into the dotted end of winding W5, the output of detector 40 on line 42 will be a positive polarity signal whose magnitude will be proportional to the magnitude of the DC input signal.

Assuming now that the DC signal from source 28 is reversed to flow into the undotted end of input signal winding 5. Under this condition, voltage VR1 will become greater than at quiescence or no input signal, and Q1 will conduct for a longer period, while voltage VR2 will become less and Q2 will conduct for a shorter period. As a consequence, the output of detector 40 on line 42 will be negative and of a magnitude proportional to the magnitude of the DC input signal.

The output of detector 40 on line 42 may be applied directly or through amplifier 52 to a suitably calibrated indicator 54 for example a zero center DC ammeter. The output of amplifier 52 may be used to control apparatus as shown at 60.

Examples of uses for multiple DC input signal windings are described in the aforementioned patent application Ser. No. 49,310.

The DC current detection apparatus disclosed herein while employing a magnetically coupled saturating core oscillator, gains added sensitivity by utilizing not only mark-space ratio of the oscillator but also the amplitudes of the input power currents in the two energizing paths of the oscillator in providing an output responsive to the unbalance due to receipt of a net DC input signal.

It should be understood that the disclosed embodiments and components are employed by way of example only and are not intended to limit the invention to the specific examples shown.

I claim:

1. Apparatus for detecting the magnitude and direction of D.C. signals comprising:
   I. A magnetically coupled oscillator including
      a. first and second D.C. power input terminals for connection to a D.C. power source,
      b. a transformer having a saturable core with winding means thereon, said winding means including signal input winding means and first and second power input windings,
      c. first and second electric valves, each having a control electrode, respective first and second main electrodes and adapted to be placed in either a conductive or a non-conductive state;
      d. first and second power input paths connected in parallel between said D.C. power input terminals for alternately effecting opposite directions of magnetic saturation in said core, each power input path including in series a different one of said power input windings and the main current path of a different one of said valves, the power input winding in each path being connected between the valve in the path and said first D.C. power input terminal, the valve in each path being connected between the power input winding in the path and said second D.C. power input terminal;
      e. feedback means for applying feedback voltages induced in said transformer to the control electrodes of said valves concurrently in opposite polarity thereby to establish concurrent opposite states of conduction in the valves, each of said valves being arranged to transfer from one to the other of said conduction states in response to feedback voltages induced in said transformer upon each occurrence of saturation in said core;
   II. first path signal providing means coupled to the said first path at a point between the power input winding in that path and said second D.C. power input terminal for providing a first path signal representing the current in that path;
   III. second path signal providing means coupled to said second path at a point between the power input winding in that path and said second D.C. input terminal for providing a second path signal representing the current in that path; and
   IV. output signal providing means coupled to said first and second path signal providing means and responsive to said first path and second path signals for providing an output signal that is indicative of the direction and amplitude of net D.C. signal input applied to said signal input winding means.

2. The combination as in claim 1 wherein each of said first and second path signal providing means comprises:
   (1) a series resistor connected into the path between the valve in the path and said second D.C. power input terminal, and (2) a voltage pick-off connected to the resistor, whereby the voltage pick-offs of the respective paths provide signals that are functions of currents in the respective paths.

3. The combination as in claim 1 wherein said output signal providing means is responsive to the difference between at least one variable of the currents of said first and second paths.

4. The combination as in claim 3 wherein said variable is current magnitude.

5. The combination as in claim 1 wherein said first and second path signals are voltage pulses, and said output signal providing means comprises a volt-second difference detector.

6. The combination as in claim 1 wherein said first and second path signals are voltage pulses, and said output signal providing means comprises difference detecting and integrating means for providing an output signal that is a function of the integral of the difference between said first and second path signals.

7. The combination as in claim 2 wherein said valves are transistors and said series resistor of each path is connected between the second D.C. power input and the emitter of the transistor in the path.

8. The combination as in claim 1 wherein said output signal providing means comprises means for providing an output signal that is a function of the difference between the respective averages of said first path and second path signals.

9. The combination as in claim 1 wherein:
   A. said first path signal providing means is coupled to said first path at a point between the valve in that path and said second D.C. power input terminal;
   B. said second path signal providing means is coupled to said second path at a point between the valve in that path and said second D.C. power input terminal; and C. said output signal providing means comprises means for providing an output signal that is a function of the difference between the respective averages of said first path and second path signals.

10. The combination as in claim 1 wherein:
A. said valves are transistors;
B. said first path signal providing means comprises a first series resistor connected into said first path between the emitter of the transistor in that path and said second D.C. power input terminal, and a first voltage pick-off connected to said first resistor for providing said first path signal in the form of voltage pulses that are a function of the current in said first path;
C. said second path signal providing means comprises a second series resistor connected into said second path between the emitter of the transistor in that path and said second D.C. power input terminal, and a second voltage pick-off connected to said second resistor for providing said second path signal in the form of voltage pulses that are a function of the current in said second path; and
D. said output signal providing means comprises means connected to said first and second pick-offs for providing an output signal that is a function of the difference between the respective volt-seconds of said first path and second path signals.

11. The combination as in claim 2 wherein said first and second path signals are voltage pulses provided by said voltage pick-offs in the respective paths, and said output signal providing means comprises means coupled to said voltage pick-offs for providing an output signal that is a function of the difference between the respective volt-seconds of the first path and second path signals.

* * * * *